United States Patent [19]
Bosco

[11] 4,204,718
[45] May 27, 1980

[54] BEARING ASSEMBLY

[75] Inventor: Armand Bosco, Tempe, Ariz.

[73] Assignee: The Garrett Corporation, Los Angeles, Calif.

[21] Appl. No.: 968,646

[22] Filed: Dec. 11, 1978

[51] Int. Cl.² .............................................. F16C 35/02
[52] U.S. Cl. ...................................... 308/15; 308/78; 308/240; 308/DIG. 4; 308/DIG. 11
[58] Field of Search .................. 29/149.5 R, 149.5 C; 308/15, 22, 26, 72, 160, 163, 164, 273 R, 238, 240, DIG. 4, DIG. 11, 78

[56] References Cited
U.S. PATENT DOCUMENTS

| | | | |
|---|---|---|---|
| 1,557,767 | 10/1925 | Oliver | 308/DIG. 4 |
| 1,562,644 | 11/1925 | Jones | 308/237 R |
| 2,075,444 | 3/1937 | Koehring | 308/163 X |
| 2,532,795 | 12/1950 | Underwood et al. | 308/9 |
| 2,683,637 | 7/1954 | Skillman, Jr. et al. | 308/239 |
| 3,014,767 | 12/1961 | Thrasher et al. | 308/72 |
| 3,040,598 | 6/1962 | Warren | 74/574 |
| 3,563,619 | 2/1971 | Evans | 308/15 |

*Primary Examiner*—Frederick R. Schmidt
*Attorney, Agent, or Firm*—Albert J. Miller; Joel D. Talcott; Stuart O. Lowry

[57] ABSTRACT

A bearing assembly for a rotating shaft comprising a spring-biased retainer for closely controlling axial and rotational freedom of a sleeve bearing.

18 Claims, 3 Drawing Figures

BEARING ASSEMBLY

BACKGROUND OF THE INVENTION

This invention relates to a bearing assembly for supporting a high speed rotating shaft. More specifically, this invention relates to a bearing assembly having improved means for preventing detrimental bearing vibration.

Bearing design constitutes a major problem in the use of high speed rotating shafts, such as in turbomachinery. That is, bearings for the shaft must be designed for rotationally centering and supporting the shaft at high speeds for prolonged periods of time without excessive vibration or high rates of wear. In turbomachinery, these shaft bearings typically comprise so-called plain bearings or bushings concentrically received over a shaft for supporting the shaft with respect to a housing or the like, and wherein suitable lubrication is provided as by oil inlets in the housing.

With high speed rotating machinery, vibratory movements of the shaft bearings or other machine components can result in rapid destruction of the bearings and corresponding failure of the rotating machinery. These vibrations may result from inherent machine imbalances, attainment of natural resonance frequencies, or a combination of these factors. In the prior art, vibration problems in the machinery have been approached by attempts to secure or lock the bearings in position. See, for example, U.S. Pat. Nos. 3,040,590 and 2,683,637 which show the use of fluid dampers and the like. Other techniques have included securing the bearings against rotation and/or axial motion within a housing as by means of locking springs, antirotation pins, or press-fit relationships between the bearings and the housing. See for example, U.S. Pat. Nos. 3,563,619; 2,532,795; and 1,562,644. However, these bearing locking techniques inherently subject the bearings to uneven axial and/or rotational wear, and non-uniform exposure to elevated temperatures. Moreover, the pins or springs themselves may vibrate or fail such as when their resonant frequencies are reached to set up corresponding vibrations in the bearings. All of these factors contribute to shortened bearing life making prior art bearings in high speed rotating machinery unsatisfactory for prolonged operation.

This invention overcomes the problems and disadvantages of the prior art by providing a bearing assembly including means for securing a sleeve bearing against detrimental vibration while allowing carefully controlled axial floating and relatively slow rotational floating of the bearing for uniform wear and temperature distribution.

SUMMARY OF THE INVENTION

In accordance with the invention, a sleeve bearing is rotationally received about a high speed rotating shaft and within a generally cylindrical carrier which is press-fit into a housing. The carrier includes a thrust face at one end providing an axial stop for the sleeve bearing. At the opposite end, the sleeve bearing engages an annular retainer biased into bearing engagement therewith by a spring, and having an axially projecting circumferential lip controllably and slightly spaced axially from a shoulder portion of the housing by said spring. The retainer transmits a circumferentially uniform spring force to the sleeve bearing to controllably limit the bearing to relatively slow rotation with respect to the carrier, and to allow controlled axial floating of the sleeve bearing during shaft rotation in accordance with the slight spacing between the retainer lip and the housing shoulder portion.

BRIEF DESCRIPTION OF THE DRAWINGS

The accompanying drawings illustrate the invention. In such drawings.

DETAILED DESCRIPTION OF THE PREFERRED EMBODIMENT

Figure 1:
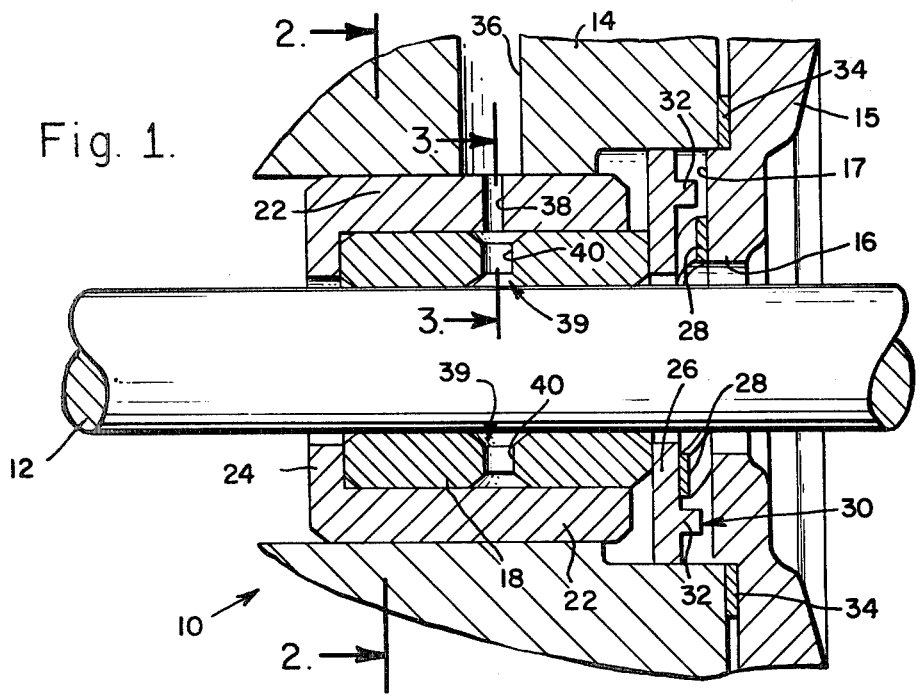
FIG. 1 is a fragmented vertical section of a bearing assembly of this invention.
Figure 2:
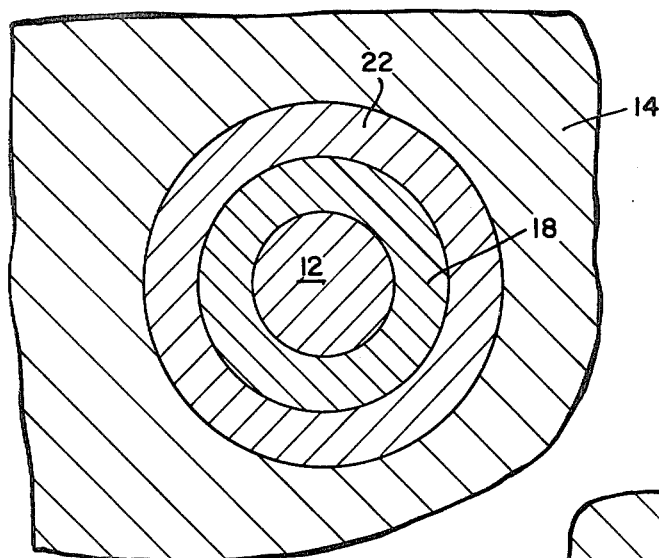
FIG. 2 is a fragmented vertical section taken on the line 2—2 of FIG. 1.

A bearing assembly 10 of this invention is shown in the drawings, and generally comprises a unit for supporting a shaft 12 during relatively high speed rotation. The shaft 12 extends axially through a housing 14 including sufficient spacing between the shaft and the housing for receipt of the supportive bearing assembly. As shown, the housing 14 may include a second housing portion 15 having a reduced clearance diameter 16 forming an axially presented shoulder 17 against which the bearing assembly 10 may seat. If desired, suitable seals (not shown) in the form of O-rings, piston rings, and the like may be provided for sealing passage of the shaft through the housing, all in a well known manner.

Figure 3:
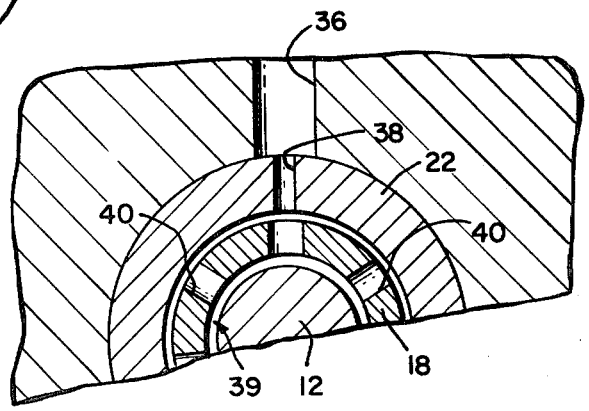
FIG. 3 is an enlarged fragmented vertical section taken on the line 3—3 of FIG. 1.

The bearing assembly 10 comprises a generally cylindrical ring or sleeve bearing 18 formed from a suitable material such as bronze or the like. The bearing 18 has an inner diameter sized for relatively close reception over the shaft 12 for rotatably receiving and supporting the shaft. The sleeve bearing 18 is closely and concentrically received within a cylindrical carrier 22 which is press-fit into the housing 14 so as to prevent carrier rotation or axial movement. As shown, the carrier 22 includes at one end a radially inwardly projecting thrust face 24 against which one end of the sleeve bearing 18 engages to limit axial motion of the sleeve bearing. Moreover, the carrier 22 includes a radial passage 38 aligned axially with a radial port 36 in the housing 14 for admission of a lubricating fluid such as oil to the bearing 18. Conveniently, as illustrated in FIGS. 1 and 3, the radial thickness of the sleeve bearing 18 in the vicinity of the carrier passage 38 is reduced, as at 39, and includes a plurality of radial openings 40 so as to allow ample lubricant flow to both the inner diameter and the outer diameter of the sleeve bearing.

The opposite end of the sleeve bearing 18 extends beyond the axial termination of the carrier 22, and axially bears against a washer-like annular retainer 26 received within the housing 14 and having a inner diameter for relatively loose reception over the shaft 12. The retainer 26 is axially biased into abutting engagement with the sleeve bearing 18 as by a washer spring 28 interposed between the retainer 26 and the shoulder housing portion 15. In this manner, a controlled spring force is applied axially to the sleeve bearing 18 to symmetrically and relatively lightly load the bearing 18 against axial motion between the retainer 26 and the carrier thrust face 24. Importantly, in the event axial loading exceeds the controlled spring force, a limited degree of axial floating of the sleeve bearing 18 is permitted against the effects of the axial spring force. However, the magnitude of this axial floating is carefully controlled and limited by the spacing 30 between an axially presented circumferential lip 32 on the retainer 26 and the shoulder housing portion 15. The precise magnitude of this axial gap 30 may be conveniently controlled by shims 34 interposed between the housings 14 and 15 to safely limit potential bearing misalignment from axial play as well as any adverse effects due to spring resonance.

The washer spring 28 urges the retainer 26 into frictional contact with the sleeve bearing 18 to also control rotational freedom or floating of the bearing. More specifically, the spring force is applied to the bearing via the retainer symmetrically about the circumference of the bearing. The magnitude of the spring force is carefully chosen to limit rotational floating of the bearing to a relatively slow rotational speed, as compared to the rotational speed of the shaft 12. In this manner, excessive bearing vibrations are prevented and the bearing is prevented from rotating at a rate sufficient to reach its own natural resonance frequency. Moreover, radial excursions of the shaft 12 transmitted to the bearing 18 are damped by the spring force to further protect the bearing against detrimental vibrations. At the same time, however, the bearing rotates sufficiently for uniform circumferential wear and uniform exposure over its operating life to elevated temperatures.

In one operating example of the bearing assembly of this invention, a sleeve bearing 18 was received within a carrier 22 and over a 1.625 inch diameter shaft 12 with a 0.008 inch outer diameter clearance and a 0.005 inch inner diameter clearance. At high speed operation of the shaft, say at about 60,000 revolutions per minute, sufficient lubricating oil was supplied via the oil ports 36, 38 and 40 to set up a hydrodynamic oil film between the bearing 18 and the carrier 22, and between the bearing and the shaft 12. Importantly, the washer spring 28 axially biased the retainer 26 into boundary frictional contact with the bearing 18 to slow down rotation of the bearing with respect to the carrier 22 to a relatively slow rotational speed, say about 200–300 revolutions per minute. Moreover, the spring-biased retainer 26 biased the bearing 18 against axial play, with a limited amount of play being permitted as determined by the gap 30 having a magnitude of about 0.002 inches. In this manner, the sleeve bearing rotated sufficiently for uniform wear and temperature exposure, and shifted axially to accommodate axial loading and unbalances in the system.

The bearing assembly 10 of this invention may incorporate various modifications and improvements without varying from the scope of the invention. For example, the various clearances, spring forces, and gaps may be altered as desired for a given system without departure from the invention. Accordingly, specific design parameters identified herein are intended by way of example only and not as any limitation upon the invention.

What is claimed is:

1. A bearing assembly for supporting a relatively high speed rotating shaft with respect to a housing comprising a sleeve bearing rotationally received over the shaft; a bearing carrier mounted within a passage formed in the housing and rotationally receiving said sleeve, said carrier having an inwardly radiating thrust face at one end forming an axial stop for bearing engagement with one end of said bearing; an annular retainer received over the shaft for bearingly engaging the other end of said bearing; a radially inwardly projecting housing shoulder portion adjacent said retainer and axially movable with respect to the housing; spring means interposed between said retainer and said shoulder portion for axially spacing said retainer from said shoulder portion and for biasing said retainer into circumferentially uniform frictional engagement with said bearing to limit axial and rotational freedom of said bearing; and means for closely predetermining the axial position of said shoulder portion with respect to the housing, and thereby also predetermine the axial spacing between said retainer and said shoulder portion.

2. A bearing assembly as set forth in claim 1 wherein said bearing carrier is generally cylindrical in shape, and is mounted within the passage against axial or rotational movement.

3. A bearing assembly as set forth in claim 1 including means forming lubricant flow passages in said bearing, carrier, and housing for guiding lubricant to the inner diameter and the outer diameter of said bearing for establishing hydrodynamic films between the bearing and shaft, and between the bearing and carrier.

4. A bearing assembly as set forth in claim 1 wherein the other end of said bearing extends axially beyond the carrier for bearing engagement with said retainer.

5. A bearing assembly as set forth in claim 1 wherein said spring means comprises a washer spring.

6. A bearing assembly as set forth in claim 1 wherein said retainer includes a circumferential lip extending axially toward said shoulder portion, said retainer and lip being normally biased axially away from said shoulder portion.

7. A bearing assembly as set forth in claim 1 wherein said spring means symmetrically loads said bearing axially between said retainer and said carrier thrust face, and symmetrically loads said bearing circumferentially.

8. A bearing assembly as set forth in claim 1 wherein said spring means circumferentially loads said retainer into frictional engagement with said bearing to restrict said bearing to relatively slow rotation with respect to the shaft.

9. A bearing assembly for supporting a relatively high speed rotating shaft with respect to a housing comprising a sleeve bearing rotationally receiving the shaft; a generally cylindrical bearing carrier fixedly mounted within a passage formed in the housing and rotationally receiving said sleeve, said carrier having an inwardly radiating thrust face at one end forming an axial stop for engagement with one end of said bearing; means forming lubricant flow passages in said bearing, carrier, and housing for guiding lubricant to the inner diameter and the outer diameter of said bearing for establishing hydrodynamic films between the bearing and shaft, and between the bearing and carrier; an annular retainer received over the shaft for engaging the other end of said bearing; a radially inwardly projecting housing shoulder portion adjacent said retainer and axially movable with respect to the housing; a circumferential lip on said retainer extending axially toward said shoulder portion for engagement therewith; spring means between said retainer and shoulder portion for axially biasing said retainer into circumferentially uniform frictional engagement with said bearing to axially bias said bearing against axial floating and to restrict said bearing to relatively slow rotational movement with respect to the shaft, said lip being normally biased away from the shoulder portion to form a slight axial spacing therebetween defining the allowable magnitude of axial freedom of said bearing, said shoulder portion forming an axial stop for engagement with said lip preventing axial bearing floating beyond said allowable magnitude; and means for closely predetermining the axial position of said shoulder portion with respect to said housing.

10. A method of supporting a relatively high speed rotating shaft with respect to a housing comprising the steps of rotationally receiving a sleeve bearing over the shaft; rotationally receiving the sleeve bearing within a bearing carrier mounted within a passage formed in the housing and including an inwardly radiating thrust face at one end forming an axial stop for one end of the bearing; receiving an annular retainer over the shaft for bearing engagement with the other end of the bearing; forming a radially inwardly projecting housing shoulder portion adjacent the retainer and movable axially with respect to the housing; springably biasing the retainer with spring means interposed between the retainer and the shoulder portion into circumferentially uniform frictional engagement with the bearing to limit axial and rotational freedom of the bearing; and predeterminably positioning the shoulder portion with respect to the housing to form a slight axial spacing between the housing and the shoulder portion and thereby allow limited axial freedom of the bearing.

11. The method of claim 10 including the step of fixedly mounting the bearing carrier within the housing against axial or rotational movement.

12. The method of claim 10 including the step of forming lubricant flow passages in the bearing, carrier, and housing for guiding lubricant to the inner diameter and outer diameter of the bearing for establishing hydrodynamic films between the bearing and shaft, and between the bearing and carrier.

13. The method of claim 10 including the step of forming the sleeve bearing to extend axially beyond the carrier for bearing engagement with the retainer.

14. The method of claim 10 wherein said biasing step comprises symmetrically loading the bearing axially between the retainer and carrier thrust face, and symmetrically loading the bearing circumferentially for relatively slow rotation with respect to the shaft.

15. A method of supporting a relatively high speed rotating shaft with respect to a housing comprising the steps of rotationally receiving a sleeve bearing over the shaft; rotationally receiving the sleeve bearing within a bearing carrier having an inwardly radiating thrust face at one end forming an axial stop for engaging one end of the bearing; fixedly mounting the bearing carrier within a passage formed in the housing; forming lubricant flow passages in the bearing, carrier and housing for guiding lubricant to the inner diameter and outer diameter of the bearing for establishing hydrodynamic films between the bearing and shaft, and between the bearing and carrier; receiving an annular retainer over the shaft for bearing engagement with the other end of the bearing; forming an inwardly radiating housing shoulder portion adjacent the retainer and movable axially with respect to the housing; forming a circumferential lip on said retainer extending axially toward the shoulder portion; mounting spring means between the retainer and shoulder portion for springably biasing the retainer into circumferentially uniform frictional engagement with the bearing to bias the bearing against axial floating and to restrict the bearing to relatively slow rotation with respect to the shaft, said retainer lip being normally biased away from the shoulder portion to form a slight axial spacing therebetween defining an allowable magnitude of axial bearing freedom; and predeterminably selecting the axial position of the shoulder portion for controlling the allowable magnitude of axial bearing freedom.

16. A method of supporting a relatively high speed rotating shaft with respect to a housing comprising the steps of rotationally receiving a sleeve bearing over the shaft; receiving the sleeve bearing and shaft through a passage formed in the housing; axially restraining one end of the sleeve bearing; forming an inwardly radiating housing shoulder portion adjacent the other end of the sleeve bearing and axially movable with respect to the housing; springably restraining the other end of the sleeve bearing with spring means interposed between the bearing and the shoulder portion to bias the bearing against axial floating and to restrict the bearing to relatively slow rotation with respect to the shaft, said bearing being normally biased away from the shoulder portion to form a slight axial spacing therebetween; and predeterminably selecting the axial position of the shoulder portion for controlling the magnitude of the slight axial spacing.

17. The method of claim 16 wherein said springably restraining step comprises the steps of receiving an annular retainer over the shaft for bearing engagement with the other end of the sleeve bearing, and springably biasing the retainer into circumferentially uniform frictional engagement with the bearing to limit axial and rotational freedom of the bearing.

18. A bearing assembly for supporting a relatively high speed rotating shaft with respect to a housing comprising a sleeve bearing rotationally received over the shaft and rotationally received within a passage formed in the housing; means forming a thrust face for axially restraining one end of said sleeve bearing; an inwardly radiating housing shoulder portion adjacent the other end of said sleeve bearing and axially movable with respect to the housing; spring means interposed between said sleeve bearing and said shoulder portion for axially biasing said sleeve bearing against axial floating and for restricting said sleeve bearing to relatively slow rotation with respect to said shaft, said sleeve bearing being normally biased away from said shoulder portion to form a slight axial spacing therebetween; and means for closely predetermining the axial position of said shoulder portion with respect to the housing, and thereby also predetermine the axial spacing between said sleeve bearing and said shoulder portion.

* * * * *